United States Patent [19]

Tanaka et al.

[11] Patent Number: 4,928,236

[45] Date of Patent: May 22, 1990

[54] DISPLAY METHOD IN AN INFERENCE TRACE OF AN EXPERT SYSTEM

[75] Inventors: Toshiyuki Tanaka, Yamatokoriyama; Shigeki Kuga, Nara; Nobuo Nakamura, Yamatokoriyama; Taro Morishita; Masahiro Wada, both of Nara, all of Japan

[73] Assignee: Sharp Kabushiki Kaisha, Osaka, Japan

[21] Appl. No.: 221,348

[22] Filed: Jul. 19, 1988

[30] Foreign Application Priority Data

Jul. 22, 1987 [JP] Japan .................................. 62-184122

[51] Int. Cl.⁵ .......................................... G06F 15/18
[52] U.S. Cl. ...................................... 364/513; 364/188
[58] Field of Search ................ 364/513, 188, 189, 190

[56] References Cited

U.S. PATENT DOCUMENTS 4,752,888 8/1988 Rappaport et al. ................. 364/513

*Primary Examiner*—Allen MacDonald
*Attorney, Agent, or Firm*—Birch, Stewart, Kolasch & Birch

[57] ABSTRACT

An expert system having a forward inference control method in which an inference process (hereinafter referred to as trace) is displayed in consideration of the condition of a negation when the trace is displayed to verify a rule inputted to the expert system, whereby, a user can confirm that a rule is unexecutable because of the condition of the negation being not satisfied.

11 Claims, 7 Drawing Sheets

Fig. 4

```
            <selling check>
if
    execution    (execution stage   : initialization
                  time              : time           )
    kind of job  (time              : time
                  person in charge  : NO             )
    person data  (name              : name
                  person in charge  : YES            )
    individual   (time              : time
                  name              : name           )
then
    (modify 2    (person in charge  : YES          ))
;
```

Fig. 5

| | |
|---|---|
| [FIRE] | execution of rule |
| »[WM] | addition of fact to working memory |
| «[WM] | deletion of fact from working memory |
| »[CS] | executable rule |
| «[CS] | unexecutable rule |
| »[BETA] | unexecutable because condition of negation is not satisfied though condition of acknowledgement is satisfied |
| «[BETA] | condition of acknowledgement is not satisfied because condition of negation is not satisfied though condition of acknowledgement is satisfied |
| [CS→BETA] | unexecutable because condition of negation is not satisfied |
| [BETA→CS] | executable because condition of negation is satisfied |

DISPLAY METHOD IN AN INFERENCE TRACE OF AN EXPERT SYSTEM

BACKGROUND OF THE INVENTION

1. Field of the Invention

The present invention relates to a question and answer system (hereinafter referred to as expert system) capable of processing a medical diagnosis, a failure diagnosis, an integrated circuit designing, scheduling and the like, and more particularly, to an improved display system of the inference process (trace) of a question and answer system having forward and backward inference control methods.

2. Description of Prior Art

An expert system easily capable of processing a medical diagnosis, a failure diagnosis, a scheduling and the like has been directed people's attentions in various fields. Therefore, expert systems of various types are proposed. It is now possible to construct an expert system using a small computer such as a personal computer owing to the improvement of an integrated circuit according to the development of a semiconductor technique. Under these circumstances, people buy expert shells from manufacturers and input the information of rules and facts into expert systems so as to construct expert systems of their own. It is indispensable that an expert system has a function of easily and correctly displaying an inference process (trace) as well as an inference execution.

The following three are displayed as the inference process in the expert system having a forward inference method:

(1) executed rules
(2) change (addition or deletion) of a working memory
(3) change (addition or deletion) of executable rules There is a case in the above (3) in which a rule is unexecutable because the condition of a negation is not satisfied although all the conditions of an acknowledgement are satisfied.

A conventional expert system has a problem in that it has no function for indicating that a rule is unexecutable because of the condition of a negation not being satisfied, which causes a user to wonder why the rule is unexecutable.

SUMMARY OF THE INVENTION

Accordingly, it is an object of the present invention to provide an expert system having a forward inference control method in which an inference process (hereinafter referred to as trace) is displayed in consideration of the condition of a negation when the trace is displayed to verify a rule inputted to the expert system.

According to the trace display method of the expert system of the present invention, the trace is displayed on the display screen separate from the normal inference execution display screen. The forward trace is displayed in consideration of the condition of a negation. Accordingly, a user can confirm that a rule is unexecutable because the condition of the negation is not satisfied, and further, he is able to know an execution process in detail and easily verify the rule.

BRIEF DESCRIPTION OF THE DRAWINGS

The object and feature of the present invention will become apparent from the following description taken in conjunction with the preferred embodiments thereof with reference to the accompanying drawings, in which:

FIG. 4 shows an example of a forward inference rule including the condition of a negation;

FIG. 5 shows an example of the content of trace information;

DETAILED DESCRIPTION OF THE INVENTION

Figure 1:
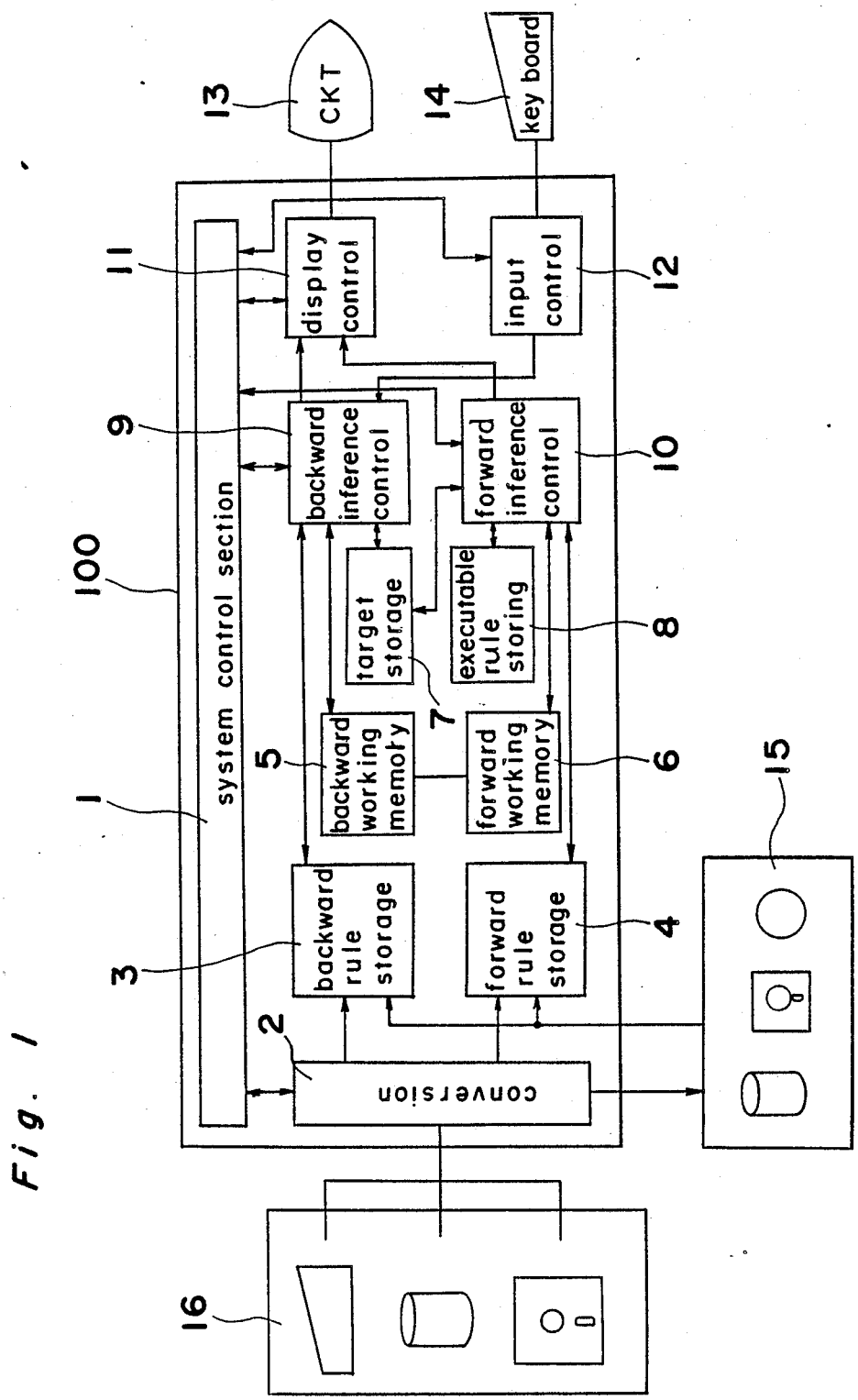
FIG. 1 is a block diagram showing an expert system employing the trace display method according to the present invention.

FIG. 1 is a block diagram showing an expert system employing the trace display method according to the present invention.

The expert system comprises a question and answer processing section 100, a CRT display screen 13, a keyboard 14, an external storing means 15, and an external input means 16. The question and answer processing section 100 comprises a system control portion 1, a converting portion 2, a backward rule storing portion 3, a forward rule storing portion 4, a backward working memory 5, a forward working memory 6, a target storing portion 7, an executable rule storing portion 8, a backward inference control portion 9, a forward inference control portion 10, a display control portion 11, and an input control portion 12. A user inputs the information of a rule necessary for an inference to the converting portion 2 of the question and answer processing section 100 through the external input means 16.

The converting portion 2 separates inputted information of rules and converts them into a fact, a forward inference rule, and a backward inference rule so that the forward inference control portion 10 and the backward inference control portion 9 may interpret them. The information of converted rules are stored in the working memories 5 and 6, the forward rule storing portion 4, and the backward rule storing portion 3. The converted contents can be stored in the external storing means (secondary storing means) 15 such as a floppy disk. The system control portion 1 analyzes an instruction inputted thereto from the keyboard 14, thus controlling the converting portion 2, the backward inference control portion 9 and the forward inference control portion 10, according to the instruction inputted from the keyboard 14. The backward inference control portion 9 collates the latest target set in the target storing portion 7 with the contents stored in the backward working memory 5 and the backward rule storing portion 3. According to the result thus collated, the backward inference control portion 9 sets a new target in the target storing portion 7 or interrogates a user. The forward inference control portion 10 collates the contents of the forward working memory 6 and the forward rule storing portion 4 so as to select executable rules. The selected rules are stored in the executable rule storing portion 8. If there are a plurality of executable rules, the forward inference control portion 10 performs a conflict resolution among them so as to execute one of them.

The display control portion 11 displays the information, transmitted from the forward inference control portion 10 and the backward inference control portion 9, on the display screen of the CRT display screen 13. The display information having indicators at the front ends thereof are transmitted from the forward inference control portion 10 and the backward inference control portion 9 to the display control portion 11. The following indicators are displayed on the CRT display screen 13 in this embodiment.

1. normal display
2. backward trace display
3. forward trace display
4. error display
5. menu display
6. rule display
7. working memory display The display control portion 11 has memories of a normal inference execution display screen and an trace display screen and selects either the normal inference execution display or the the trace display according to the indicators attached to the front ends of the display information transferred from the forward and backward inference control portions 10 and 9.

Figure 2:
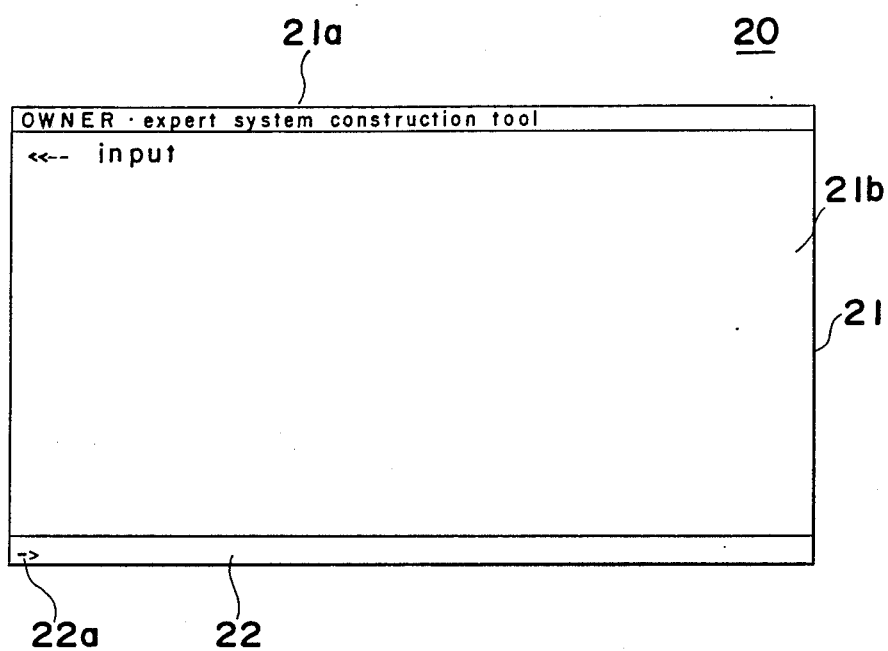
FIG. 2 shows an example of the display of a normal execution display screen.

Referring to FIG. 2 in which an example of a normal inference execution display screen is shown, the display screen 20 includes an inference execution display screen 21 comprising a system name displaying portion 21a (which is disposed on the uppermost line thereof and displays the name of the expert system) a question and answer displaying portion 21b, and an input instruction displaying portion 22 disposed on the lowermost line thereof. An inputted instruction is displayed in the right adjacent to an arrow 22a of the input instruction displaying portion 22.

Figure 3:
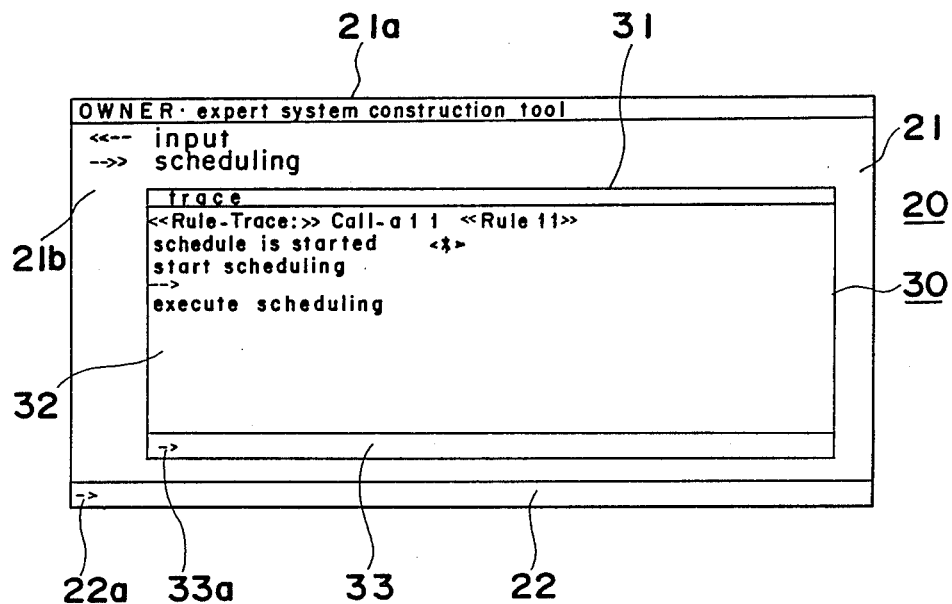
FIG. 3 shows an example of a trace display screen.

How the trace is displayed will be described hereinbelow. When the trace display is selected, the system control section 1 instructs the forward inference control portion 10 and the backward inference control portion 9 to transfer trace information to the display control portion 11. The forward inference control portion 10 and the backward inference control portion 9 transmit the trace information having indicators of the trace information to the display control portion 11. On receipt of the trace information having the indicators of the trace information from the backward inference control portion 9, the display control portion 11 displays the trace information on the CRT display screen 13 as shown in FIG. 3. In this embodiment, the trace display screen 30 is displayed on the normal inference execution display screen 20. The trace display screen 30 comprises a display portion 31 which is provided on the uppermost line thereof and displays "trace", a trace information display portion 32, and an input information display portion 33.

The display screen of the trace information display portion 32 displays either a backward trace or a forward trace. Which of the backward and forward inference processes is displayed on the trace information display portion 32 is controlled by an instruction which is inputted from the keyboard 14 and displayed in the right adjacent to an arrow 33a of the input information display portion 33. A step (step by step) execution or a continuous execution can be specified by the instruction inputted through the key board 14.

If the system interrogates a user, the trace display automatically disappears and the normal execution display screen 20 appears. Accordingly, if the system interrogates the user while the trace display is on the normal inference execution display screen, a rule can be easily verified.

The trace display of the rule including the condition of a negation (starts with (—)) is described hereinbelow.

FIG. 4 shows a rule of "check person in charge of selling" as an example of a forward inference rule including the condition of a negation.

According to conventional expert systems, a user cannot distinguish the following (1) from (2) ((1) and (2) described hereinbelow) when a rule, including the condition of a negation as shown in FIG. 4, is displayed.

(1) is unexecutable because the condition of an acknowledgement is not satisfied.

(2) is unexecutable because the condition of a negation is not satisfied.

In this embodiment, the content of the trace information is displayed with a symbol as shown in FIG. 5 so that the content of the trace information can be easily understood. Specifically, an executable rule is represented by CS and the condition of the above-described (2) (the condition of the acknowledgement is satisfied, but the condition of the negation is not satisfied) is represented by Beta so that (1) and (2) can be distinguished from each other.

The operation for allowing the content of the trace information to correspond with a symbol is described hereinbelow.

Figure 6:
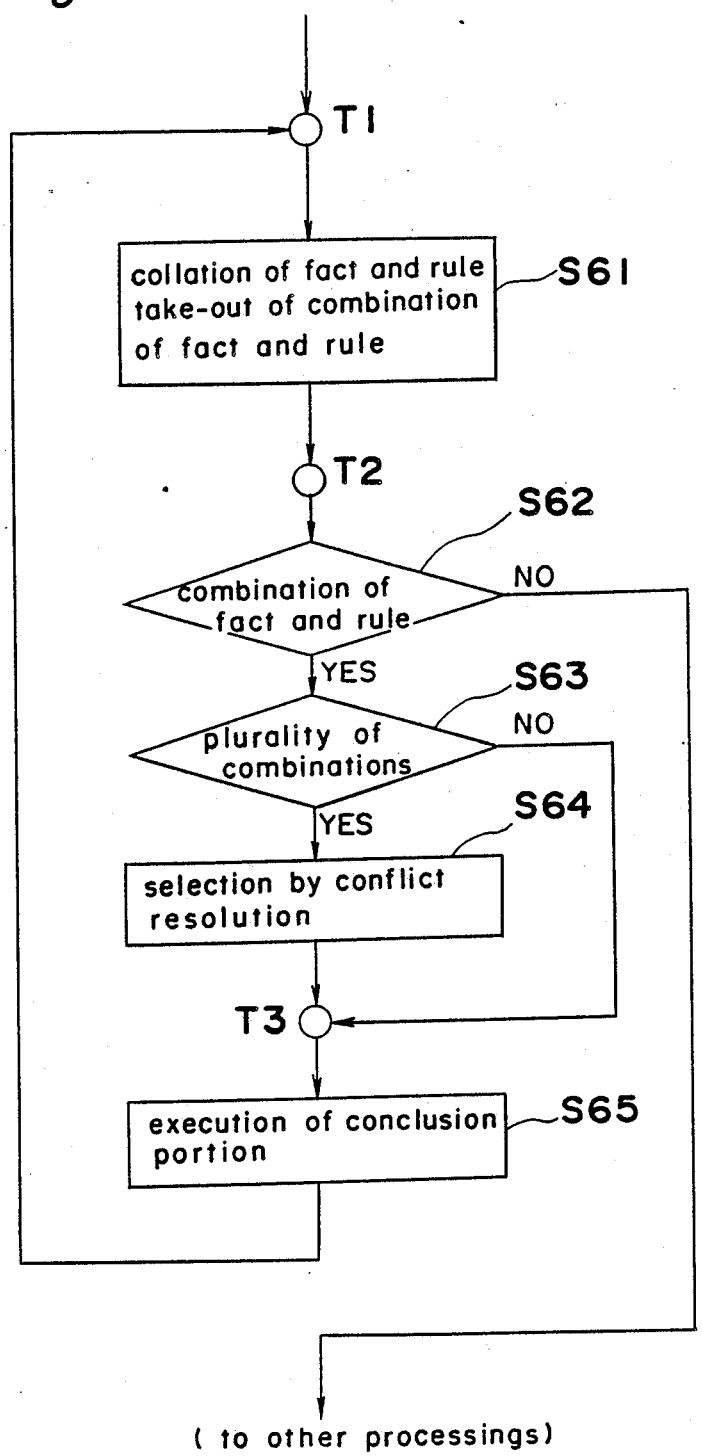
FIG. 6 is an execution processing flowchart of a forward inference according to the present invention.

FIG. 6 is a processing flowchart to be used when a forward inference is executed in this embodiment.

A forward inference means an inference mechanism "to execute a conclusion when a condition is satisfied because a fact matches a rule". Accordingly, a fact and a rule stored in a working memory (WM) are collated with each other at step 61 so as to take out a combination of a fact and a rule which satisfies a condition, and then, it is checked at step 62 whether or not there is a combination of the fact and the rule which satisfies the condition. In this case, a rule which satisfies the condition at one time-collation is referred to as "executable rule" which is always accompanied by a fact satisfying the condition. Facts are distinguished from each other by a series of numbers attached thereto. Therefore, even if there are two identical facts, they can be distinguished from each other by the numbers. A fact which accompanies an executable rule is processed by the number attached thereto.

Thereafter, it is checked at step 63 whether or not there are a plurality of executable rules. If yes, which of a plurality of executable facts to be executed is then selected, i.e., a conflict resolution is performed at step 64. Strategies, or means for the conflict resolution, includes a selection of a rule which is accompanied by the latest fact. Thereafter, the conclusion portion of a rule is executed at step 65. The forward inference is performed by repeating this processing. In this case, various operations are performed in the conclusion portion of the rule, but in order to check whether or not a condition is satisfied, attention is paid only to the "addition of facts" or "deletion of facts".

Needless to say, it takes much time to collate facts with rules when many rules and facts are stored in the expert system. Considering that only a few facts are changed, that is, added or deleted in one time-execution of a rule in one execution of a rule, it is useless to collate all the facts and rules with each other.

In other words, collations of only changed facts with rules serve the purpose. This method of collation is referred to as Rete algorithm. Therefore, only a changed portion is displayed in the trace when Rete algorithm is applied. The contents to be displayed in this case are:
(1) which of the rules has been executed;
(2) how the working memory WM has been changed; and
(3) how the CS (a plurality of executable rules) has been changed.

It is important to consider whether or not the condition of a negation is satisfied, that is, to consider the condition that "a rule is unexecutable because the condition of a negation does not satisfy a rule though all the conditions of acknowledgements satisfy all the rules", which allows the user to comprehend a trace clearly.

Figure 7:
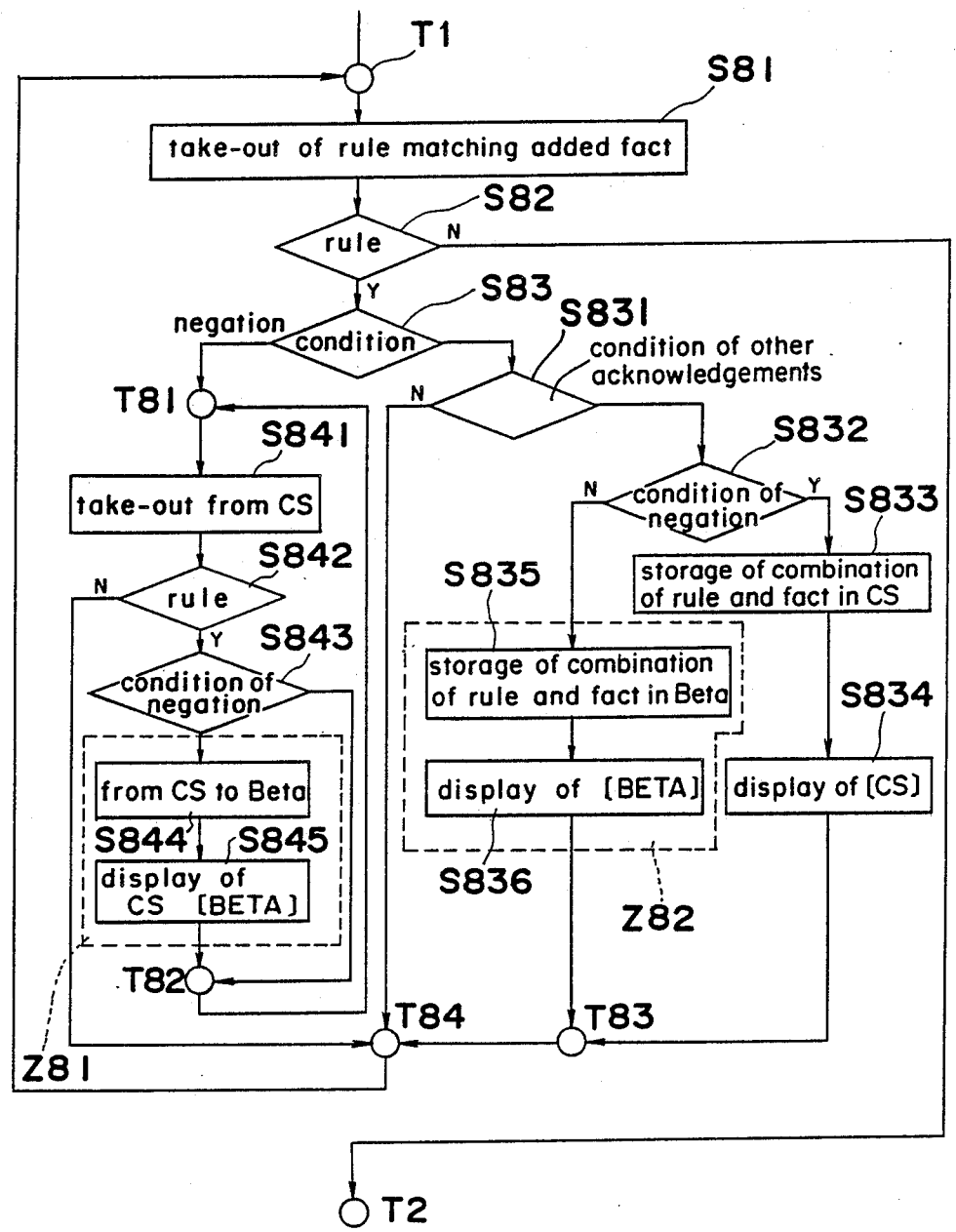
FIG. 7 is a flowchart in which a new fact is added.
Figure 8:
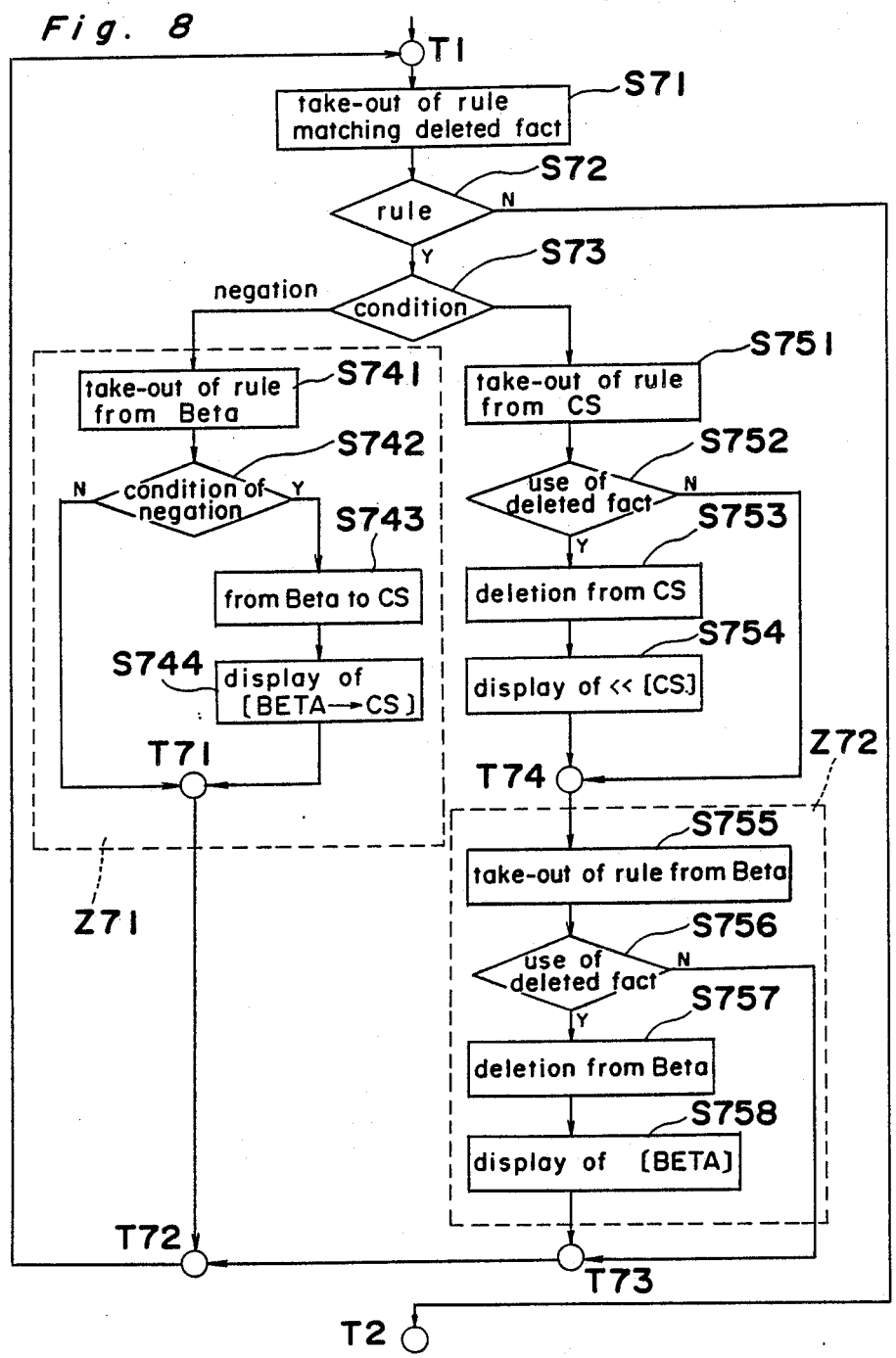
FIG. 8 is a flowchart in which a fact is deleted.

The combination of a rule and a fact in this state is referred to as Beta. Flowcharts to be applied in performing a trace in consideration of the condition of a negation in this embodiment are shown in FIGS. 7 and 8. The case in which the addition of facts are made is shown in FIG. 7. The case in which the deletion of facts are made is shown in FIG. 8.

The processings shown in FIGS. 7 is performed in the processing portion from the connector T1 to the connector T2 as part of the forward inference. As shown in FIG. 7, the processings are performed in two different manners when facts are added, that is, the case in which new CSs or Betas are produced by the addition of facts and the case in which facts are removed from CS and changed into Beta.

First, at steps 81, 82, and 83, a rule having the condition which matches an added fact is taken out. If the condition which matches the fact is affirmative, it is decided at step 832 whether or not the condition of a negation is satisfied, provided that other conditions of acknowledgements are satisfied (step 831). If yes, CS stores a combination of a rule and a fact at step 833 and >>[CS] is displayed at step 834. If no, Beta stores the combination of a rule and a fact at step 835 and >>[BETA] is displayed at step 836. If a condition which matches a fact is negative, a rule is taken out of CS at step 841, and then, it is checked at step 843 whether or not the condition of a negation is satisfied. If no, the combination of a rule and a fact is moved from CS to Beta at step 844 and the display [CS→BETA] to that effect is accomplished at 845.

As shown in FIG. 8, when a fact is deleted, there are two cases, i.e., the case in which a rule is taken out of CS or Beta and the case in which a rule is moved from Beta to CS. Similarly to the case in which a fact is added as shown in FIG. 7, a rule which matches a deleted fact is taken out of all the rules at steps 71, 72, and 73. If the condition in which the fact matches the rule is affirmative, the rule is taken out of CS and Beta at steps 751 and 755,. Thereafter, it is checked whether or not the deleted fact has been used at steps 752 and 756. If yes, the rule is deleted from CS and Beta at steps 753 and 757, and the display <<[CS], <<[BETA] to that effect is effected at steps 754 and 758. When the condition in which a fact matches a rule is negative, the rule is taken out of Beta at step 741, and it is checked whether or not the condition of a negation is satisfied at step 742. If yes, the rule is moved from Beta to CS at step 743, and the display [BETA→CS] is effected.

These processings are performed to move and arrange rules after facts are added or deleted.

The portions enclosed by dotted lines Z71 and Z72, Z81, and Z82 in FIGS. 7 and 8 show Beta, namely, the condition in which a rule is unexecutable because the condition of a negation is not satisfied though the condition of an acknowledgement is satisfied. According to the present invention, the condition of Beta is displayed in these portions.

Figure 9:
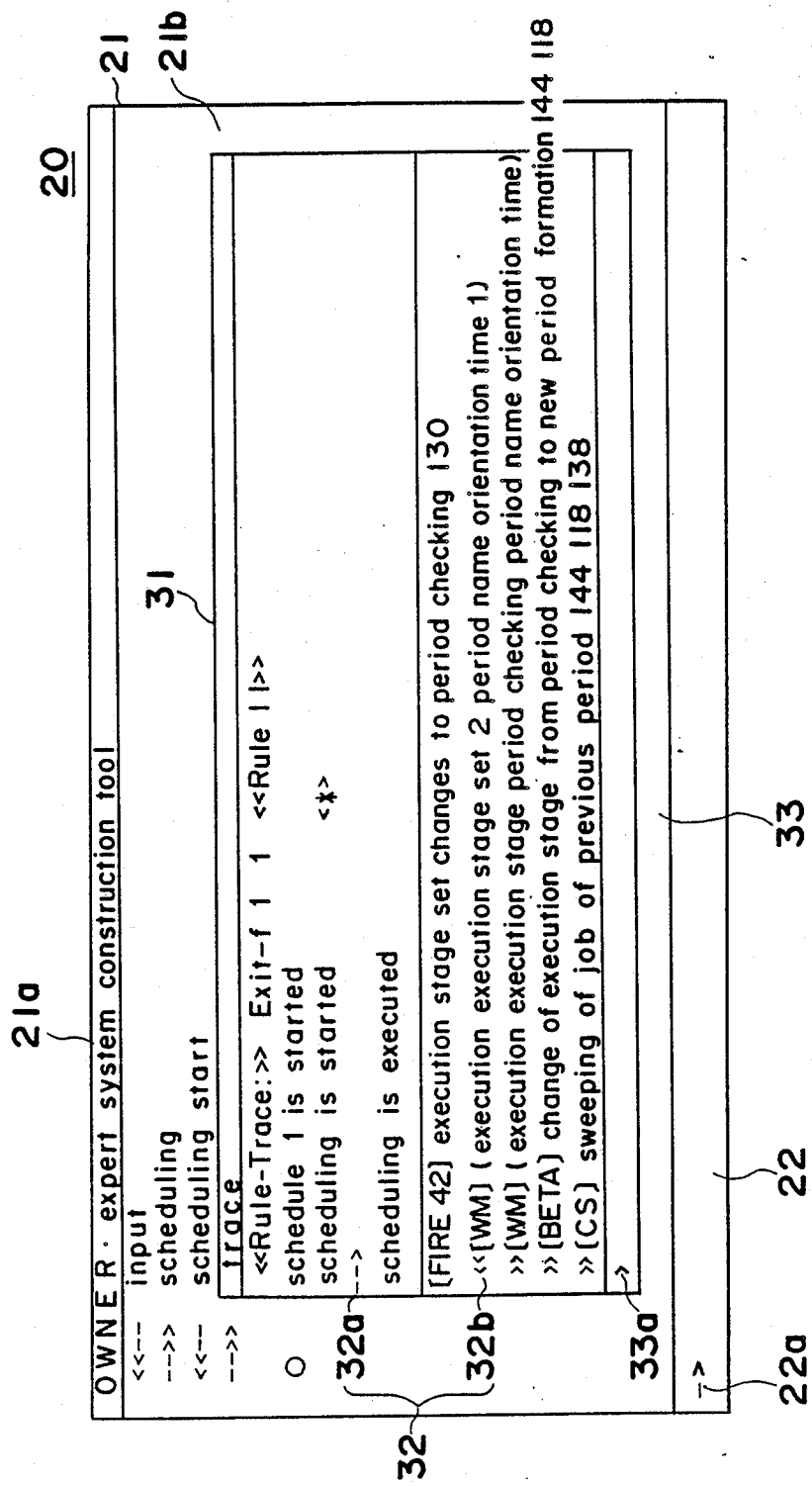
FIG. 9 shows a display example of the trace display screen according to the present invention.

An example of the trace display screen 30 displayed on the inference execution display screen 20 is shown in FIG. 9. The trace information portion 32 shown in FIG. 9 comprises a backward trace display screen 32a and a forward trace display screen 32b. Since the contents of other portions are the same as those shown in FIG. 3, the description thereof is omitted herein.

In the forward trace display screen 32b in FIG. 9, it is shown that the rule that "an execution stage is changed from a period checking to a new period formation" is unexecutable because the condition of negation is not satisfied though the condition of an acknowledgement is satisfied by the formation of the elements relevant to the rule.

Although the present invention has been fully described by way of example with reference to the accompanying drawings, it is to be noted that, here, that various changes and modifications will be apparent to those skilled in the art. Therefore, unless such changes and modifications otherwise depart from the scope of the present invention, they should be construed as included therein.

What is claimed is:

1. A method for displaying a trace of a rule for forward inference control in an expert system comprising the steps of:
   (a) displaying information indicating an addition of a fact to the working memory;
   (b) determining the condition of a match between the rule and the added fact;
   (c) determining if condition of negation is satisfied if the condition in step (b) is affirmative;
   (d) displaying information indicating that the rule is executable if the condition of negation is satisfied.

2. A method as claimed in claim 1, further comprising the step of:
   (e) displaying information indicating an unexecutable rule due to the condition of negation not being satisfied if the condition of negation is not satisfied.

3. A method as claimed in claim 1, further comprising the steps of:
   (f) determining if the condition of negation is satisfied if the condition in step (b) is negative;
   (g) displaying information indicating a change in the status of a rule from executable to unexecutable if the condition of negation is not satisfied.

4. A method for displaying a trace of a rule for forward inference control in an expert system comprising the steps of:
   (a) displaying information indicating a deletion of a fact to the working memory;
   (b) determining the condition of a match between the rule and the deleted fact;
   (c) determining if a condition of negation is satisfied if the condition in step (b) is negative;
   (d) displaying information indicating a change in the status of a rule from unexecutable to executable if the condition of negation is satisfied.

5. A method as claimed in claim 4, further comprising the steps of:
(e) determining if the deleted fact has been used if the condition in step (b) is affirmative;
(f) displaying information indicating the deletion of an executable or unexecutable rule if the detected fact has been used.

6. A method of developing an expert system comprising the steps of:
(a) tracing a rule;
(1) adding a fact to a working memory;
(2) determining the condition of a match between the rule and the added fact;
(3) determining if a condition of negation is satisfied if the condition in step (2) is affirmative; and
(b) displaying information indicating that the rule is executable if the condition of negation is satisfied.

7. A method as claimed in claim 6, further comprising the step of:
(c) displaying information indicating an unexecutable rule due to the condition of negation not being satisfied if the condition of negation is not satisfied.

8. A method of developing an expert system comprising the steps of:
(a) tracing a rule;
(1) adding a fact to a working memory;
(2) determining the condition of a match between the rule and the added fact;
(3) determining if the condition of negation is satisfied if the condition in step (2) is negative; and
(b) displaying information indicating a change in status of a rule from executable to unexecutable if the condition of negation is not satisfied.

9. A method of developing an expert system comprising the steps of:
(a) tracing a rule;
(1) deleting a fact from a working memory;
(2) determining the condition of a match between the rule and the deleted fact;
(3) determining if a condition of negation is satisfied if the condition in step (2) is negative; and
(b) displaying information indicating a change in the status of a rule from unexecutable to executable if the condition of negation is satisfied.

10. A method of developing an expert system comprising the steps of:
(a) tracing a rule;
(1) changing the contents of a working memory by adding or deleting a fact; and
(2) determining the executability of a rule in consideration of a condition negation;
(b) displaying a trace of a rule in consideration of the condition of negation.

11. A method of developing an expert system comprising the steps of:
(a) tracing a rule;
(1) changing the contents of a working memory by adding or deleting a fact;
(2) determining if a condition of negation is satisfied;
(3) determining a rule to be non-executable if the condition of negation is not satisfied;
(b) displaying information indicating a non-executable rule as information indicating not satisfying a condition of negation so as to indicate to a user why such a rule is non-executable.

* * * * *